March 19, 1929.  J. L. IRVIN ET AL  1,705,923
PORTABLE PIPE CUTTING TORCH SUPPORT
Filed March 23, 1927   2 Sheets-Sheet 1
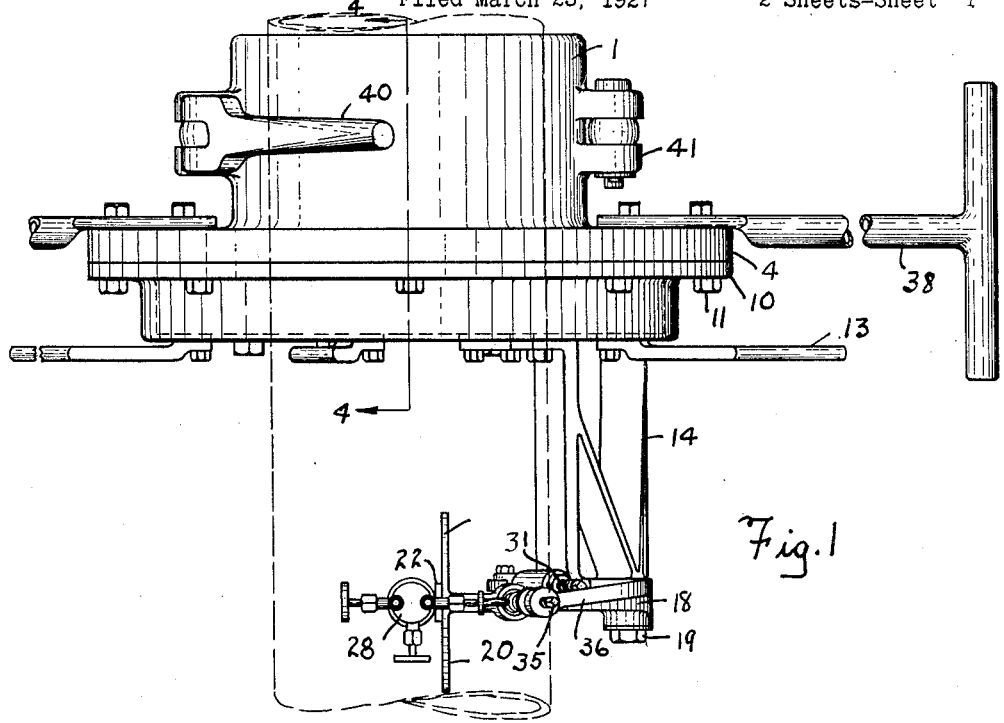
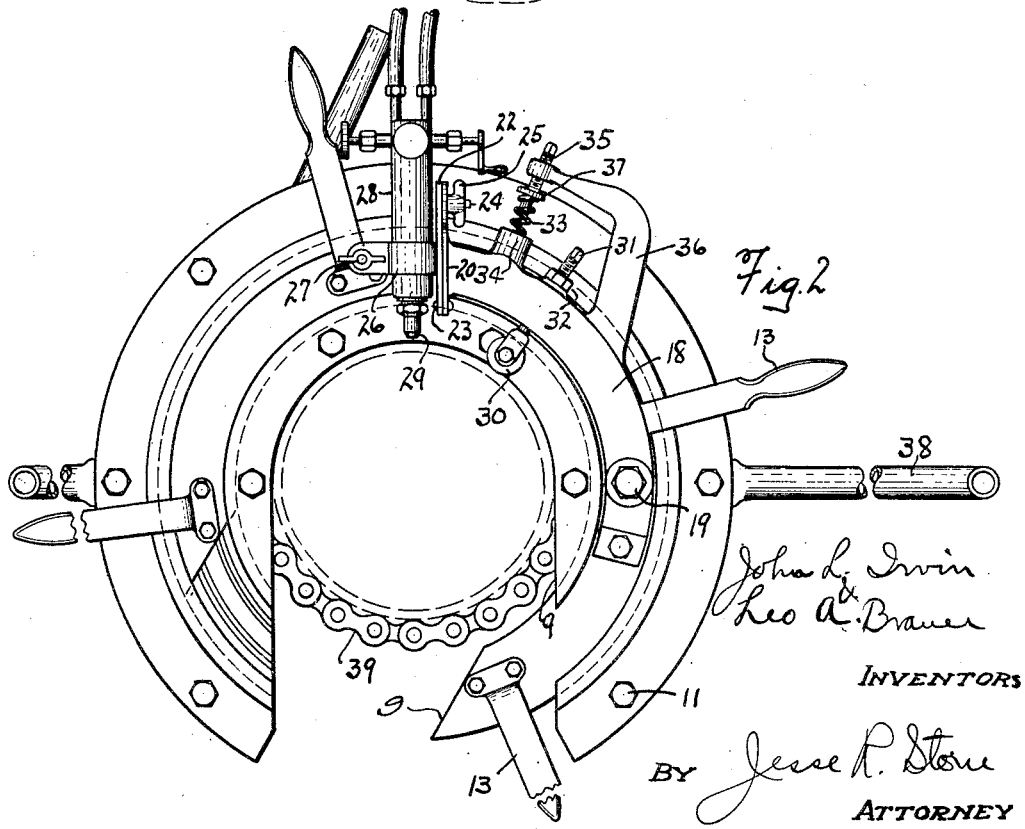

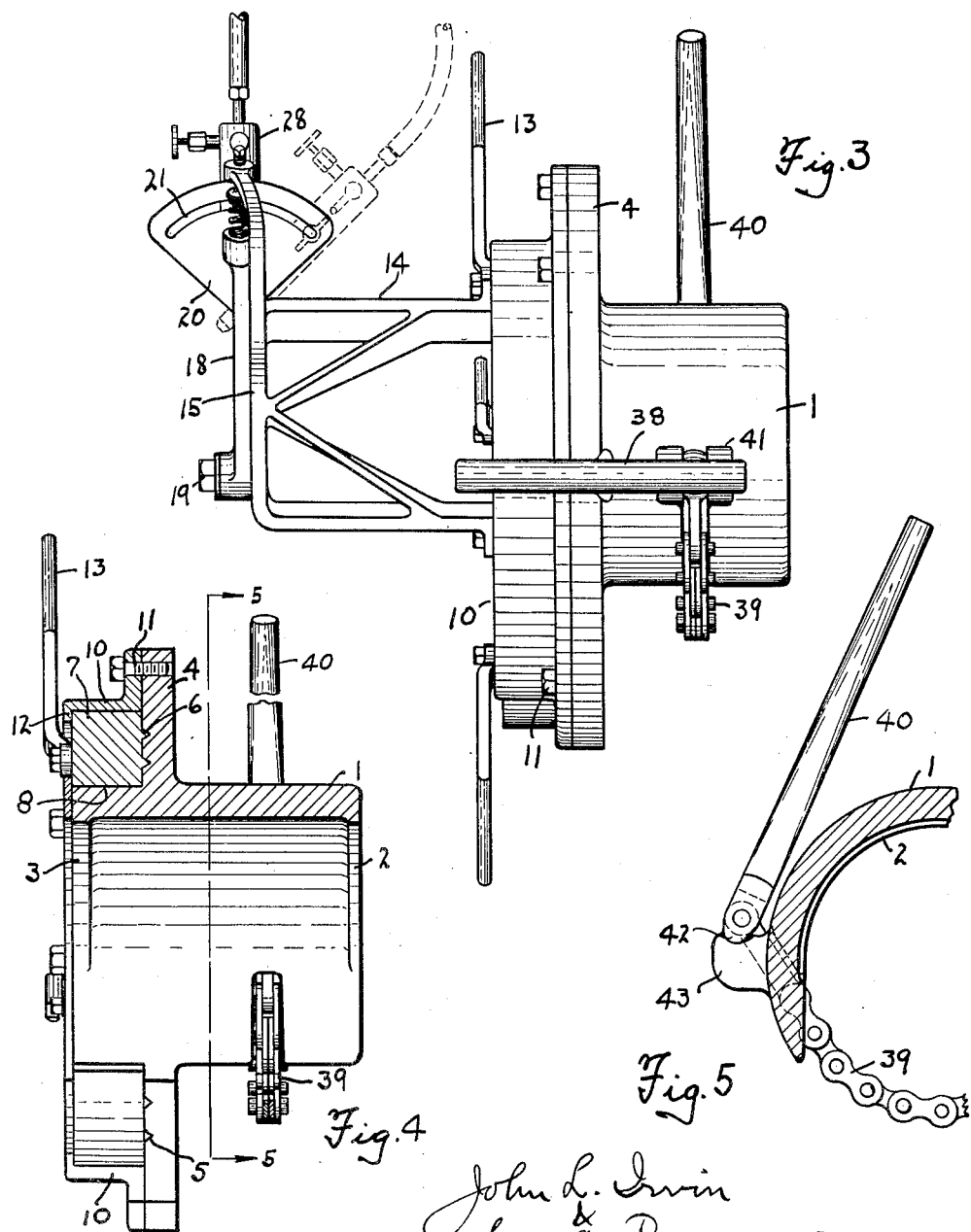

Patented Mar. 19, 1929.

1,705,923

UNITED STATES PATENT OFFICE.

JOHN L. IRVIN AND LEO A. BRAUER, OF HOUSTON, TEXAS.

PORTABLE PIPE-CUTTING-TORCH SUPPORT.

Application filed March 23, 1927. Serial No. 177,799.

Our invention relates to an apparatus for cutting pipe by means of a cutting torch, said apparatus being designed for use with comparatively large pipe such as is employed in pipe line work.

The invention is designed for use in cutting pipe in field work where ordinary shop facilities are not available.

It is an object to provide a portable device which may be readily positioned upon the pipe, and the cutting torch thereon directed along a desired line about the pipe so as to sever the same in the manner desired.

It is also our aim to so mount the torch that the pipe may be cut on a beveled line and to thus leave the pipe sections in shape for re-use, with a slight inwardly tapered bevel at each end.

The invention resides in the construction and arrangement of the parts of the device, whereby the pipe may be effectively cut in the manner set out.

Referring to the drawing herewith, Fig. 1 is a top plan view of the invention. Fig. 2 is a front elevation of the device. Fig. 3 is a side elevation thereof. Fig. 4 is a section on the line 4—4 of Fig. 1. Fig. 5 is a transverse section on the line 5—5 of Fig. 4.

In the practical construction of our device, we employ a frame to fit over the pipe to be cut, said frame having means to clamp the same to the pipe, and means to support the blow-torch in such manner that the torch may be movable in a path about the pipe to sever it into sections. The frame shown in the drawing includes a tubular body 1 having its lower side open so that it may be fitted over the pipe to be cut. The inner surface of this frame has ridges 2 and 3 at its ends projecting inwardly to contact with the pipe.

The forward end of the frame has a radially extending flange 4, the forward face of which has a plurality of annular grooves 5 therein to receive ridges at tongues 6 on a supporting ring 7. The said ring 7 is shaped to rotate in the seat 8 formed on the outer face of the frame adjacent the flange 4 and is open at 9 on one side, as is the frame, so as to be fitted over the pipe to be cut.

The ring 7 is held rotatable in its seat upon the frame by a plate 10, the outer margin of which is clamped to the flange 4 by means of cap screws 11. The plate fits about the supporting ring 7 and has a forward inwardly bent flange 12 to retain the ring in its seat. The plate, like the ring and frame has an opening at one side to allow it to be introduced over the pipe.

The ring is rotatable in its seat through means of a plurality of radial handles 13 which are bolted to the forward face of the ring and are extended forwardly and then radially outward into position to be gripped by the operator.

The torch is supported upon a frame or bracket 14 secured to said rotatable ring. As seen in the drawing the frame or bracket 14 has two legs secured to the ring 7 at spaced points, said legs projecting forwardly from the ring and connecting with an arcuate cross plate 15.

Upon said plate is an arcuate arm 18 pivoted at one end 19 thereof to the said plate 15 and having its other end formed into an approximately triangular plate 20 extending in a plane at right angles to the plane of the arm. This plate has an arcuate slot 21 therein extending through about 90° of a circle.

To this plate is secured a torch holding clamp including a plate 22 pivoted at its lower end 23 to the apex of the plate 20. Its outer end has a threaded pin 24 thereon extending through slot 21 and having a thumb nut 25 thereon to set said plate at any desired position relative to said slot 21. The plate 22 has a pair of spring arms 26 shaped to fit about a cutting torch 28 and having a transverse thumb screw 27 at the outer ends of said arms to clamp the arms about said torch.

The torch which we show is a common commercial form of torch of the oxyacetylene type, having a nozzle 29 directed inwardly. Its structure need not be further noted. The arm 18, upon which the torch is mounted, has a guide roller 30 adapted to ride upon the pipe and hold the nozzle of the torch in uniformly spaced relation adjacent the pipe. Said roller is mounted upon a pin 31 extending radially through the arm and adjustable therein by means of a nut 32 threaded thereon.

The arm is held resiliently toward the pipe, to cause said roller 30 to rest thereon, by means of a spring 33 having its inner end fitting within a recessed boss 34 on said arm 18. The outer end of said spring fits about an adjustable screw 35 extending through an angular arm 36 formed upon the plate 15 of the bracket 14. The screw 35 has a flange 37 thereon to support said spring 33 at its outer end.

The frame 1 of the device has oppositely extending handles 38 thereon secured to the flange 4 of said frame and furnishing means by which the device may be moved from place to place.

The device may be clamped rigidly in position upon a pipe by means of a chain 39 and lever 40. Said chain is engaged at one end to a pair of spaced lugs 41, and its opposite end is secured to the end of said lever 40 adjacent the forward rounded end 42 of said lever. Two lugs 43 on said frame act to receive the end 42 of the lever and permit the tightening of the chain about the pipe by means of the lever in an obvious manner.

In operating the device, the frame will be positioned at the desired point upon the pipe so as to bring the torch nozzle upon the line along which the pipe is to be cut. The frame will be then clamped to the pipe as described. The torch will be set at the desired angle, and it is ordinarily desired to cut the pipe so as to have the pipe section beveled at an angle of approximately 45°, the torch being positioned as shown in dotted lines in Fig. 3. The torch is held in proper relation to the pipe by the spring and roller 30. The ring and the torch thereon may then be rotated slowly about the pipe through the handles 13 until the pipe is completely severed. The frame may be then adjusted to cut the pipe at another point and the torch may then be set at the opposite end of the slot 21 from its previous position, indicated in Fig. 3, and the severed pipe section will then have both its ends beveled outwardly.

The advantages of the structure lie in the fact that it is easily portable, easily and quickly adjustable upon the pipe, and it will cut along a predetermined line about the pipe quickly and accurately.

Having thus described our invention, what we claim as new is:

1. In a device of the character described, a tubular frame having one side open to adapt it to be fitted about a pipe, means to clamp said frame to a pipe, a flange on said frame, a ring on said frame adjacent said flange, means to rotate said ring on said frame, a bracket on said ring and a torch holder on said bracket, comprising an arcuate arm pivoted upon said bracket and means to detachably engage a torch.

2. In a device of the character described, a tubular frame having one side open to adapt it to be fitted about a pipe, means to clamp said frame to a pipe, a flange on said frame, a ring on said frame adjacent said flange, means to rotate said ring on said frame, a bracket on said ring and a torch holder on said bracket, said holder including a pivoted arm, and means on said arm adapted to ride the pipe and limit the movement of said torch toward said pipe.

3. In a device of the character described, a tubular frame, handles thereon to allow said frame to be moved, said frame having a slot therein to permit said frame to be fitted on a pipe, a torch holder, means on said frame to support said torch holder and to allow its movement about said frame and a pipe and means to retain said torch holder resiliently within a predetermined distance from said pipe when said supporting means is moved about said pipe.

4. In a device of the character described, a tubular frame adapted to fit about a pipe, a torch support rotatable on said frame, an arcuate arm pivoted upon said support, a torch holder on said arm, and means to force said arm and holder resiliently toward said pipe.

5. In a device of the character described, a tubular frame adapted to fit about a pipe, a torch support rotatable on said frame, an arcuate arm pivoted upon said support, a torch holder on said arm, and means mounted on said torch support to force said arm and holder resiliently toward said pipe.

6. In a device of the character described, a tubular frame adapted to fit about a pipe, a torch support rotatable on said frame, an arcuate arm pivoted upon said support, a torch holder on said arm, and means to force said arm and holder resiliently toward said pipe, and a roller on said arm adapted to ride upon the work and limit the movement of said arm toward said work.

7. In a device of the character described, a frame adapted to fit about a pipe, means to clamp said frame to a pipe, a support rotatable on said frame about the pipe, an arm on said support, a torch holder on said arm, means to vary the angle of said holder on said arm, and means to govern the position of said holder relative to the work.

In testimony whereof we hereunto affix our signatures this 16th day of March, A. D. 1927.

JOHN L. IRVIN.
LEO A. BRAUER.